(12) United States Patent
Mako

(10) Patent No.: US 10,162,067 B2
(45) Date of Patent: Dec. 25, 2018

(54) RADIATION IMAGING APPARATUS AND METHOD OF CONTROLLING THE SAME

(71) Applicant: CANON KABUSHIKI KAISHA, Tokyo (JP)

(72) Inventor: Yuta Mako, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/675,875

(22) Filed: Aug. 14, 2017

(65) Prior Publication Data

US 2018/0067215 A1    Mar. 8, 2018

(30) Foreign Application Priority Data

Sep. 6, 2016 (JP) .................................. 2016-174004

(51) Int. Cl.
  *G01T 1/24* (2006.01)
  *G01T 1/20* (2006.01)
  *H04N 5/32* (2006.01)

(52) U.S. Cl.
  CPC ............ *G01T 1/247* (2013.01); *G01T 1/2018* (2013.01); *H04N 5/32* (2013.01)

(58) Field of Classification Search
  CPC .......... G01T 1/2018; G01T 1/247; H04N 5/32
  See application file for complete search history.

(56) References Cited

U.S. PATENT DOCUMENTS

2009/0251125 A1* 10/2009 Hawver .................... G01T 7/00
                                                                  323/355

FOREIGN PATENT DOCUMENTS

| JP | H09-038071 | 2/1997 |
| JP | 2006-523125 | 10/2006 |
| WO | WO 2004/095064 A | 11/2004 |

* cited by examiner

Primary Examiner — Mark R Gaworecki
(74) Attorney, Agent, or Firm — Venable LLP

(57) ABSTRACT

A radiation imaging apparatus, which comprises a sensor array in which a plurality of pixels are arranged in a matrix form, cyclically perform a storing operation that stores charge in the pixels and a reading out operation that reads out the charge stored in the pixels, based on a synchronization signal comprised of a cyclical pulse train and a timing control signal synchronized to the synchronization signal. The radiation imaging apparatus changes a phase of the timing control signal in relation to the synchronization signal in accordance with a range of a partial region for trimming in a region of the sensor array in which read out is possible.

17 Claims, 6 Drawing Sheets

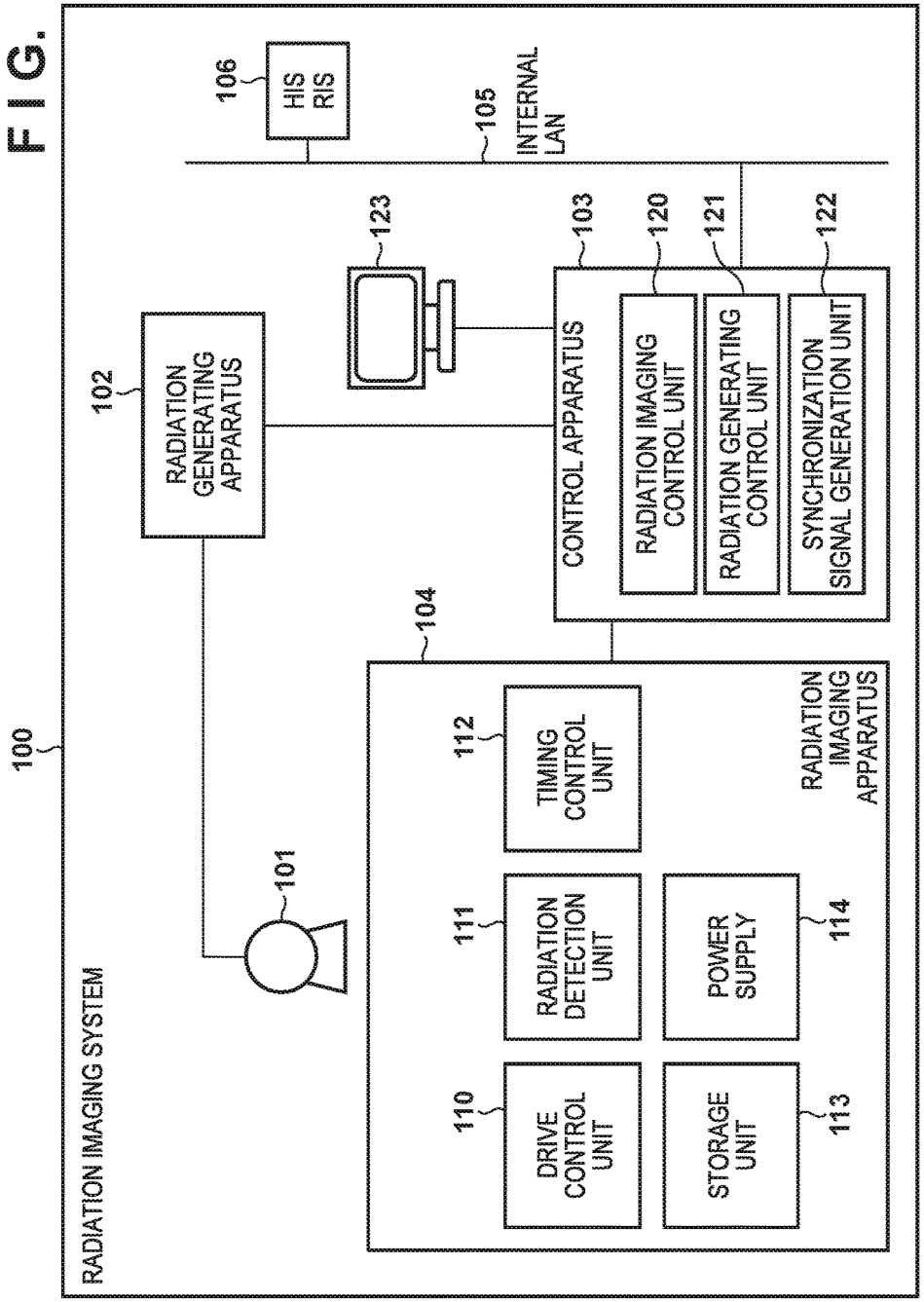

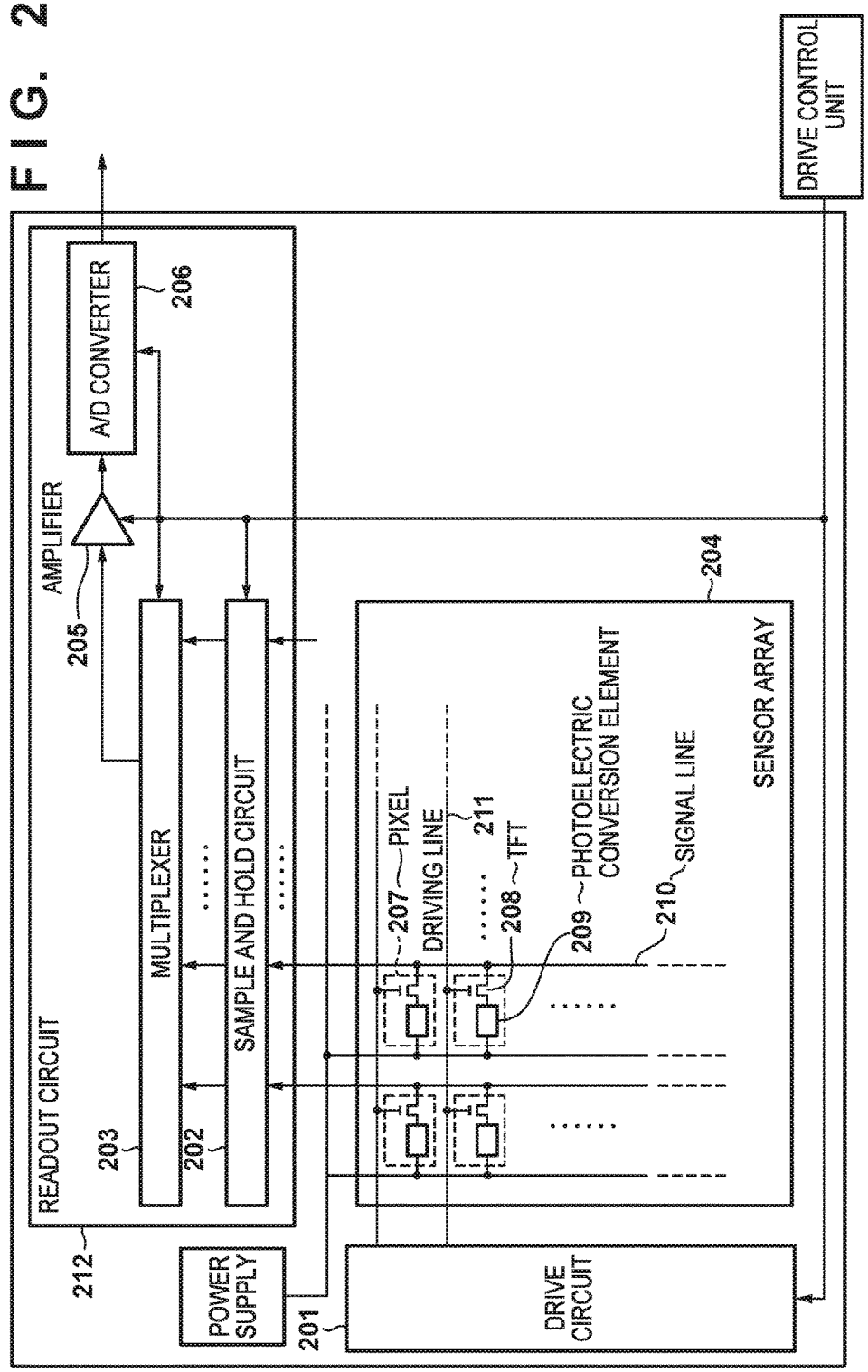

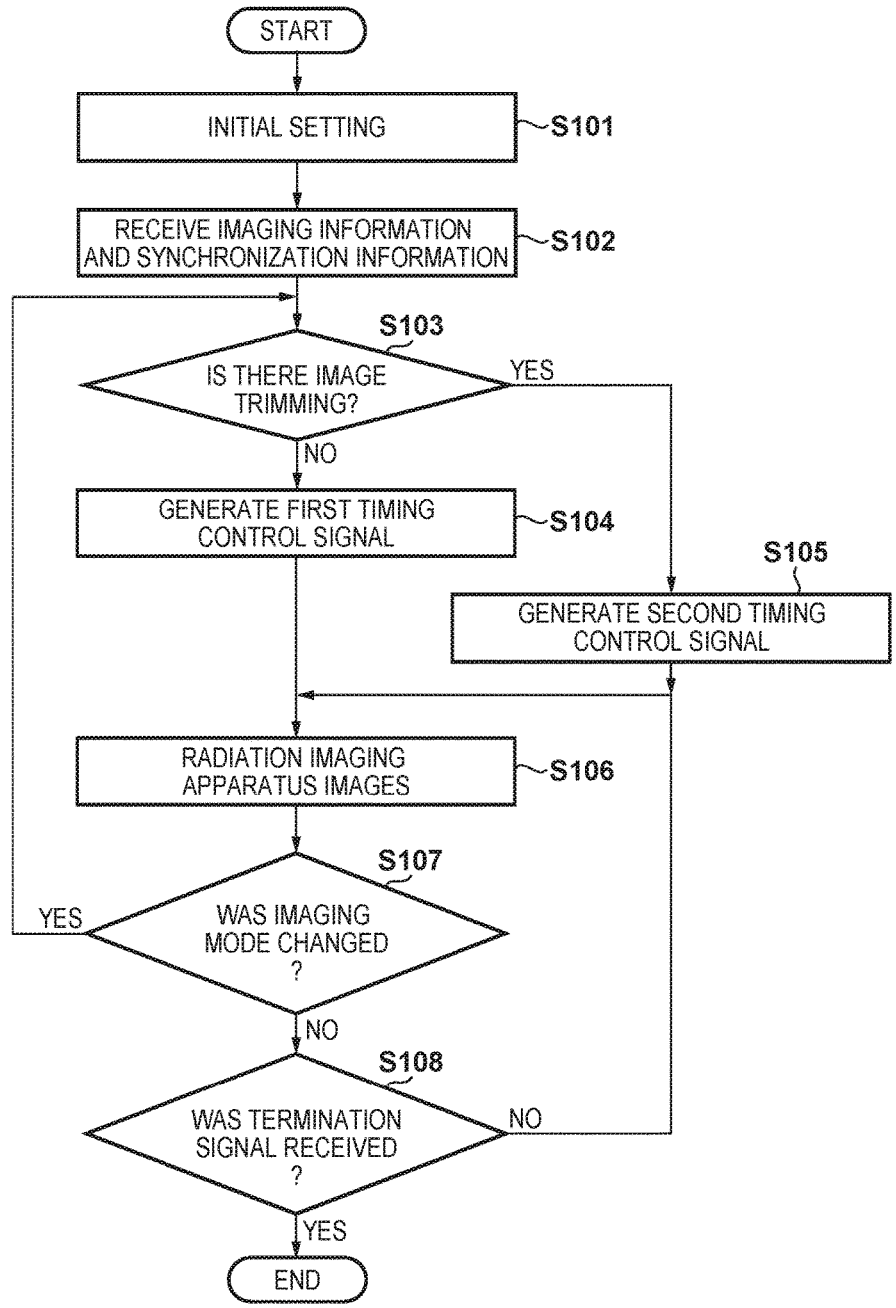

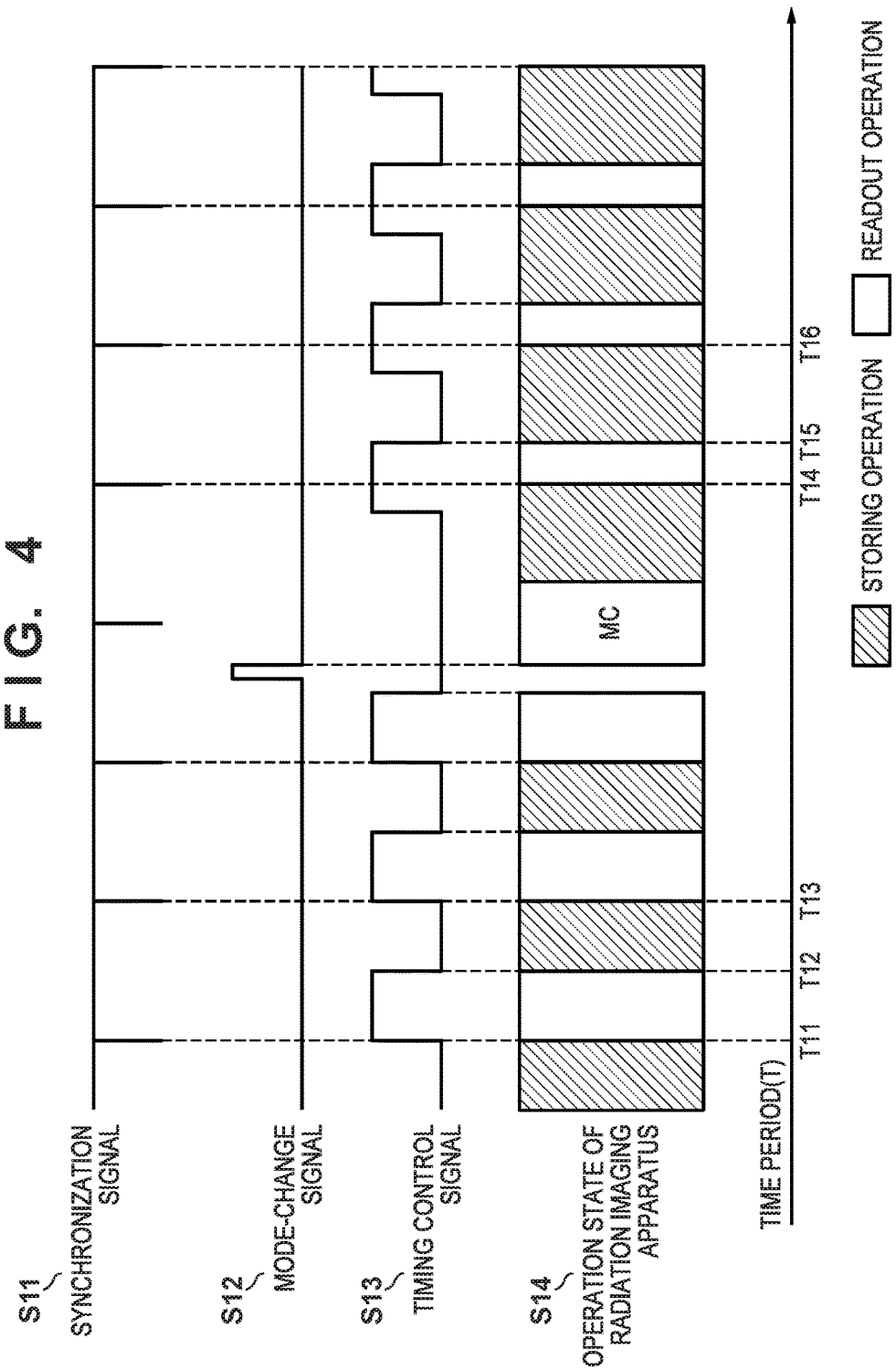

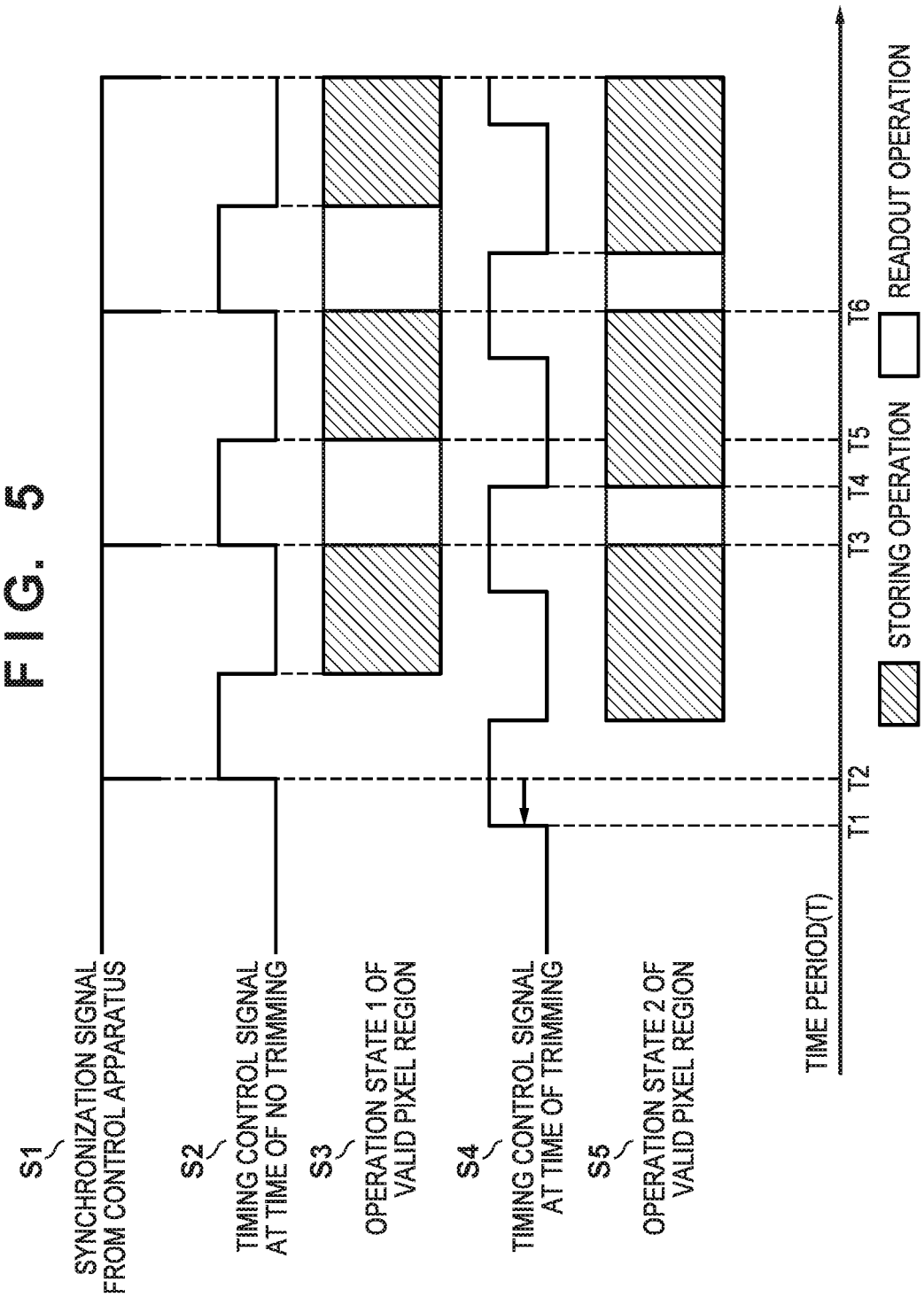

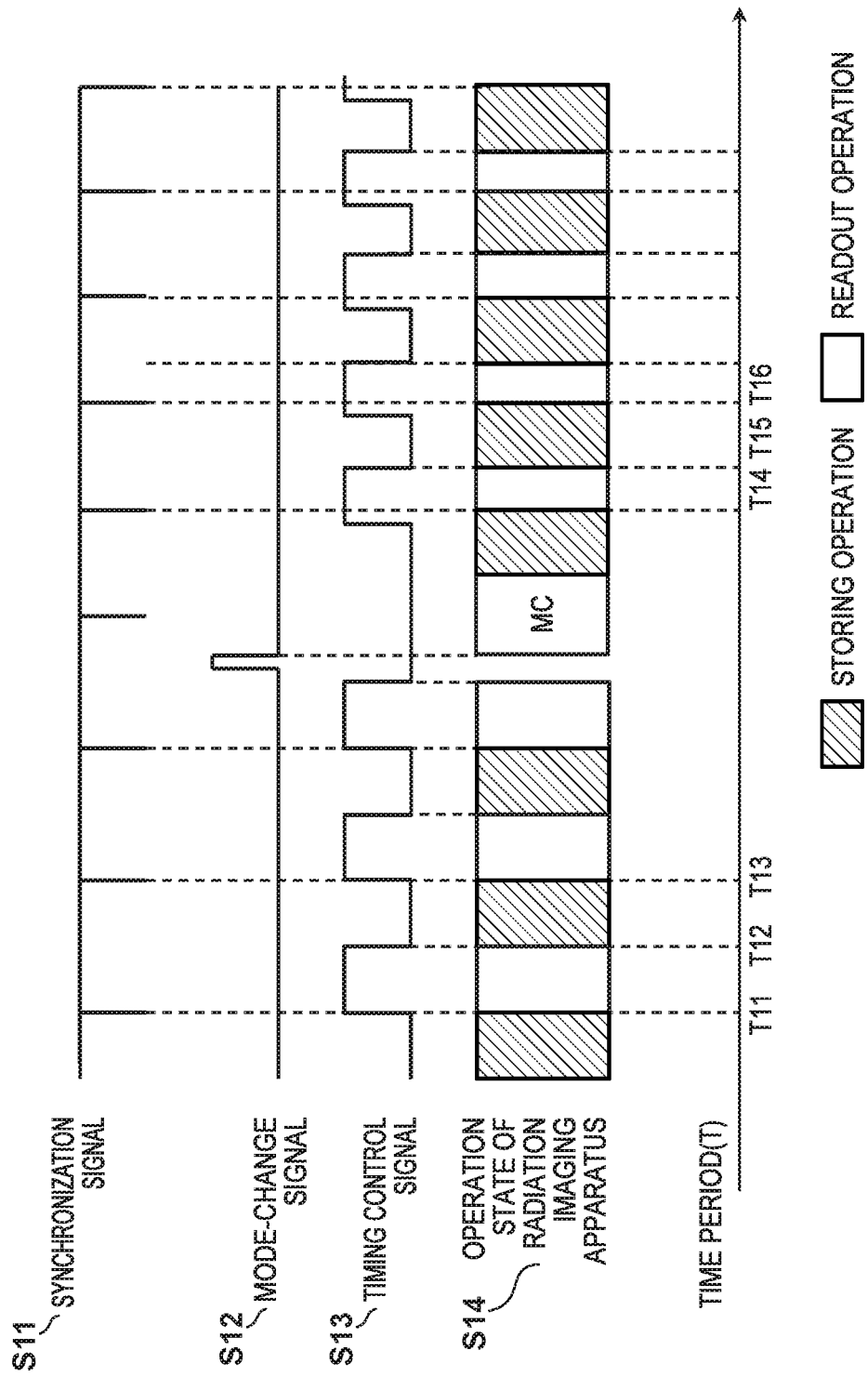

RADIATION IMAGING APPARATUS AND METHOD OF CONTROLLING THE SAME

BACKGROUND OF THE INVENTION

Field of the Invention

The present invention relates to a technique for obtaining radiation that passes through a subject as an image.

Description of the Related Art

Conventionally, radiation imaging apparatuses that obtain a digital image (radiation image) by emitting radiation towards a subject from a radiation generating apparatus, and digitizing the radiation after it passes through the subject have been commercialized. The radiation imaging apparatus can obtain a clear image by performing image processing on the obtained radiation image. The radiation imaging apparatus, by transferring an image obtained in this way to a control apparatus such as a control computer, enables medical imaging diagnosis and saving on the control apparatus side.

Among radiation imaging apparatuses, there are those that use a sensor array in which pixels configured by conversion elements for converting radiation into signal charges (electrical signals) and switch elements such as a TFT (Thin Film Transistor) that transfers the electrical signal to the outside are arranged two-dimensionally (refer to Japanese Patent Laid-Open No. 2006-523125). Such a radiation imaging apparatus reads a signal charge converted in a conversion element by using a switch element such as a TFT, and forms a digital image from a read out charge amount. Also, such a radiation imaging apparatus, compared to radiation imaging apparatuses that use conventional X-ray film or an imaging plate, have high instantaneousness, and can perform fluoroscopy that projects video in real time rather than just one radiation image.

Specifically, fluoroscopy is imaging that obtains consecutive images by emitting radiation consecutively or cyclically. It is possible to observe the motion of a subject from consecutive images obtained by fluoroscopy. Fluoroscopy can be performed in different imaging modes depending on an imaging part or the like. For example, in a case where the imaging part of the subject is a portion such as a heart that moves quickly, high-speed imaging in a small field of view is desirable, and in a case where the imaging art of the subject is a portion such as a head that does not move much, low-speed imaging in a wide field of view is desirable.

In a case where imaging is performed by emitting radiation cyclically, as in fluoroscopy, a radiation emission time period is decided in accordance with the number of images displayed per unit time (hereinafter referred to as the frame rate). In fluoroscopy, the irradiation dose per unit time is restricted because it depends on the frame rate.

In a case where imaging is performed at a particularly high speed (high framerate), the radiation emission time period becomes shorter, and therefore the irradiation dose per unit time becomes smaller. When the irradiation dose is insufficient, the image itself will not be outputted, and there is the risk that it will lead to reimaging or a misdiagnosis.

SUMMARY OF THE INVENTION

In the present disclosure, in view of the above described issues, a technique is provided for ensuring a sufficient dose for radiation imaging even in a case where imaging is performed at a high speed in a small field of view.

According to one aspect of the present invention, there is provided a radiation imaging apparatus, which comprises: a sensor array in which a plurality of pixels are arranged in a matrix form; and a control unit configured to, based on a synchronization signal comprised of a cyclical pulse train and a timing control signal synchronized to the synchronization signal, cyclically perform a storing operation that stores charge in the pixels and a reading out operation that reads out the charge stored in the pixels, wherein the control unit, in accordance with a range of a partial region for trimming in a region of the sensor array in which read out is possible, changes a phase of the timing control signal in relation to the synchronization signal.

Further features of the present invention will become apparent from the following description of exemplary embodiments (with reference to the attached drawings).

BRIEF DESCRIPTION OF THE DRAWINGS

FIG. 1 illustrates an example of a configuration of a radiation imaging system in a first embodiment.

FIG. 2 illustrates an example of a configuration of a radiation detection unit in the radiation imaging apparatus.

FIG. 3 describes a flowchart of radiation imaging in the first embodiment.

FIG. 4 is a schematic diagram describing a timing chart of a mode change in the first embodiment.

FIG. 5 is a schematic diagram describing a timing chart of the radiation imaging in the first embodiment.

FIG. 6 is a schematic diagram describing a timing chart of a mode change in a second embodiment.

DESCRIPTION OF THE EMBODIMENTS

First Embodiment

Explanation is given below, while referring to the drawings, regarding a radiation imaging system including a radiation imaging apparatus in embodiments of the present invention. FIG. 1 illustrates an example of a configuration of a radiation imaging system 100 in a first embodiment. The radiation imaging system 100 is configured from a radiation source 101, a radiation generating apparatus 102, a control apparatus 103, and a radiation imaging apparatus 104.

The radiation source 101 emits radiation. The radiation generating apparatus 102 controls the radiation source 101. The control apparatus 103 controls the radiation imaging apparatus 104 and the radiation generating apparatus 102 based on input to an operation unit (not shown) by an operator. Also, the control apparatus 103, based on input to the operation unit (not shown) by the operator, collects and displays captured images received from the radiation imaging apparatus 104, receives imaging orders, and registers imaging information, patient information, or the like. The control apparatus 103 is connected to an internal LAN 105 comprised of a LAN (Local Area Network), for example. Also, an HIS/RIS 106 is connected to the internal LAN 105. HIS is an abbreviation for Hospital Information System, and RIS is an abbreviation of Radiology Information System. The control apparatus 103 and the HIS/RIS 106 can intercommunicate, and can communicate radiation image imaging orders, imaging information, and captured image data.

The radiation imaging apparatus 104 is configured from a drive control unit 110, a radiation detection unit 111, a timing control unit 112, a storage unit 113, and a power supply 114. The drive control unit 110 controls imaging and communication operation. The radiation detection unit 111 detects radiation and generates image data. An image data generation operation by the radiation detection unit 111 is described later with reference to FIG. 2. The timing control unit 112, based on a synchronization signal received from the control apparatus 103, generates and controls the timing of charge (radiation) storage and read out. The storage unit 113 is used for saving captured images and imaging information.

The control apparatus 103 is configured from a radiation imaging control unit 120, a radiation generation control unit 121, a synchronization signal generation unit 122, and a display unit 123. The display unit 123 may be integrated in the control apparatus or externally attached. The radiation imaging control unit 120 performs control of timing and conditions of image obtainment by the radiation imaging apparatus 104. The radiation generation control unit 121 performs control of timing and conditions of emission of radiation by the radiation generating apparatus 102. The synchronization signal generation unit 122 generates a synchronization signal of the radiation imaging system 100 based on information of the imaging information that is registered. The display unit 123 displays captured images and imaging information.

Information communicating between the control apparatus 103 and the radiation imaging apparatus 104, and between the control apparatus 103 and the radiation generating apparatus 102 is made possible by one or a plurality of means: cable-connected communication using a standard such as RS232C, USB, Ethernet (registered trademark), a dedicated signal line, or wireless communication. Communication of, for example, image data, control communication for image obtainment condition setting or apparatus state obtainment or the like, signals for synchronizing such as notification of a timing for image obtainment and a timing at which radiation emission is possible or the like is performed between the control apparatus 103 and the radiation imaging apparatus 104. Also, communication of, for example, control communication such as for radiation emission condition setting, radiation generating apparatus status obtainment, and actual emission information, and signals for synchronization such as a notification of radiation emission timing is performed between the control apparatus 103 and the radiation generating apparatus 102.

FIG. 2 illustrates an example of a configuration of the radiation detection unit 111 of the radiation imaging apparatus 104. The radiation detection unit 111 has a sensor array 204 comprised of a plurality of pixels 207 arranged in a two-dimensional array so as to configure a plurality of rows and a plurality of columns. The plurality of pixels 207 in the sensor array 204 are configured from a TFT 208 and a photoelectric conversion element 209, for example, and the pixels 207 are formed to comprise phosphor thereon, for example. In such a case, the radiation incident on the radiation detection unit 111, is converted into visible light by the phosphor, the converted visible light is incident on the photoelectric conversion element 209 of each pixel, and a charge according to the visible light is generated in each of the photoelectric conversion elements 209. Note that, in the present embodiment, an embodiment that comprises conversion elements for converting incident radiation into charge by the above described phosphor and photoelectric conversion elements is described. However, an embodiment that comprises so-called direct-conversion-type conversion elements that convert incident radiation into charge directly without comprising phosphor, for example, is also possible.

By switching the TFT 208 ON and OFF, storage of charge (radiation) and read out of charge are performed, and a radiation image can be obtained thereby.

For pixels in a row in a two-dimensional sensor array 204 of the radiation detection unit 111, the TFT of each pixel in the row turns ON by an ON voltage of the TFT being applied to a driving line 211 by a drive circuit 201, and thereby the charge is stored in a sample and hold circuit 202 through a respective signal line 210. After that, the stored charges are read out sequentially via a multiplexer 203 in a readout circuit 212, and after amplification by an amplifier 205, are converted into image data of a digital value by an A/D converter 206. Also, in a row for which read out of charges has finished, each pixel in the row returns to storing charge upon an OFF voltage of the TFT being applied to the driving line 211 by the drive circuit 201.

In this way, the drive circuit 201 scans by driving each line of the sensor array 204 sequentially, and all of the pixel output charges ultimately are converted into digital values. By this, the radiation detection unit 111 can read out radiographic image data. Such storing operation and readout operation control is performed by the drive control unit 110. The image data after being converted into a digital value is stored in the storage unit 113 of FIG. 1.

In the case of fluoroscopy, the readout circuit 212 of the radiation detection unit 111 repeats the readout operation in accordance with the frame rate. In a period over which radiation is emitted to the sensor array 204, the storing operation is performed, and the readout operation is not performed. Because a readout operation is not performed during the storing operation, the power supply of the readout circuit 212 may be turned OFF from the perspective of power consumption, and the power supply may be kept in the ON state from the perspective of image artifacts.

The radiation imaging apparatus 104 in the present embodiment performs radiation imaging by switching the charge storing operation and readout operation at the timing described below. With reference to FIG. 3, the procedure of radiation imaging in the present embodiment is described. FIG. 3 is a flowchart for radiation imaging by the radiation imaging apparatus in the present embodiment.

In step S101, the operator inputs the power supply of the radiation generating apparatus 102, the radiation imaging apparatus 104, and the control apparatus 103, and sets the patient at a predetermined imaging position in the radiation imaging system 100. Also, the control apparatus 103, via operation by the operator, or through the internal LAN 105, receives imaging orders. Next, the radiation imaging control unit 120 of the control apparatus 103, via an operation by the operator or through the internal LAN 105, obtains patient information or imaging information. In the present embodiment, it is assumed that the imaging information includes information of an imaging mode having elements that vary such as image size, whether or not to perform image trimming, frame rate, or the like, and an element that is a mode change signal that indicates whether the imaging mode changed. Note that the image trimming is trimming of a predetermined part of the effective region (effective pixel region) in an image region in which detection (read out) is possible. By the image trimming, an image of a small field of view can be obtained. In the present embodiment, for image trimming, a readout of the image region for which detection (read out) from the readout circuit 212 of the radiation imaging apparatus 104 is possible is performed, but it is assumed that image output and image display from the radiation imaging apparatus 104 to the control apparatus 103 is not performed for regions other than the region that is trimmed (driving for reading out an image region for which detection (read out) is possible is performed, but the actual data read out time period becomes shorter). By such control, it becomes possible to change the image size without changing control of the radiation imaging apparatus 104. Also, in the synchronization signal generation unit 122 of the control apparatus 103, a synchronization signal is generated and transmitted from the radiation generation control unit 121 to the radiation generating apparatus 102.

Also, the synchronization signal generation unit 122 of the control apparatus 103 generates a synchronization signal based on patient information and imaging information. The synchronization signal generation unit 122 transmits the generated synchronization signal to the radiation imaging apparatus 104. Note that the synchronization signal may be generated by an external apparatus other than the control apparatus 103, or transmitted to the radiation imaging apparatus 104 through the control apparatus 103, for example. Also, the radiation generation control unit 121 transmits to the radiation generating apparatus 102 the synchronization signal generated by the synchronization signal generation unit 122. The radiation generating apparatus 102 controls emission of radiation by the radiation source 101 in accordance with the received synchronization signal.

In step S102, the radiation imaging apparatus 104 receives imaging information and a synchronization signal from the control apparatus 103 (or an apparatus other than the control apparatus 103). Note that, it is assumed that the control apparatus 103, via an operation by the operator or through the internal LAN 105, periodically or in a case where an element included in the imaging information is changed, transmits imaging information to the radiation imaging apparatus 104, and the radiation imaging apparatus 104 receives the imaging information.

In step S103, the timing control unit 112 of the radiation imaging apparatus 104 determines whether or not image trimming is performed by referencing the imaging mode included in the imaging information received from the control apparatus 103. In the case where image trimming is not performed (No in step S103), the timing control unit 112, based on the timing of the synchronization signal received from the control apparatus 103, generates a timing control signal (first timing control signal) for controlling the radiation imaging (step S104).

In step S105, in the case where image trimming is performed (Yes in step S103), the timing control unit 112, based on timing that expedites (or delays) the timing of the synchronization signal received from the control apparatus 103 by a fixed period, generates the timing control signal (second timing control signal) for controlling radiation imaging. The fixed period is decided with reference to the imaging mode included in the imaging information received from the control apparatus 103, and depends on the frame rate, the effective image region read out time period, or the like, as an example.

In step S106, the radiation imaging apparatus 104 starts radiation imaging processing based on the timing control signal generated in step S104 or step S105. The radiation imaging processing based on the first timing control signal and the second timing control signal is described later with reference to FIG. 4 and FIG. 5.

In step S107, in a case where the radiation imaging apparatus 104 receives imaging information including a mode change signal from the control apparatus 103, the imaging mode is changed, and the processing returns to step S103. While the radiation imaging apparatus 104 does not receive a mode change signal from the control apparatus 103 (No in step S107), and has not received from the control apparatus 103 an imaging termination trigger signal (termination signal) or imaging information including that signal (No in step S108), the radiation imaging apparatus 104 continues radiation imaging based on the current timing control signal. Note that the radiation imaging apparatus 104 may receive a high-level mode change signal separately from the imaging information, and in such a case, the processing may return to step S102, and perform the processing from step S103 in accordance with reception of the imaging information.

In step S108, in a case where the radiation imaging apparatus 104 received an imaging termination trigger signal (termination signal) from the control apparatus 103 or imaging information including that signal (Yes in step S108), imaging terminates. In a case where imaging terminates, the radiation imaging apparatus 104 may continue to be driven as preparation for the next imaging.

FIG. 4 is a schematic diagram illustrating a timing chart for switching between the storing operation and the readout operation for radiation imaging according to an imaging mode change (mode change) in the present embodiment. Note that it is assumed that the timing chart is started in a no image trimming imaging mode.

The timing control unit 112 of the radiation imaging apparatus 104, based on the timing signal received from the control apparatus 103, generates a timing control signal (S13) (first timing control signal of step S104). In the case of no image trimming, the operation state (S14) of the radiation imaging apparatus, in accordance with the timing control signal (S13), repeats the readout operation (T12-T11) and the storing operation (T13-T12). Specifically, the drive control unit 110, based on the synchronization signal and the timing control signal, provides a drive signal to the radiation detection unit 111 so that the radiation detection unit 111 repeats a readout operation (T12-T11) and a storing operation (T13-T12) in a synchronization signal interval.

When the mode change signal (S12) becomes the high level, the operation state of the radiation imaging apparatus (S14) enters a mode change state (MC in FIG. 4). Within the mode change state, based on information of the imaging mode included in imaging information transmitted from the control apparatus 103, it is determined whether or not image trimming is to be performed. If the result of this determination is that image trimming is to be performed, the timing control signal (S13) is expedited by a fixed period (second timing control signal of step S105). The operation state (S14) of the radiation imaging apparatus repeats the readout operation (T15-T14) and the storing operation (T16-T15). Specifically, the drive control unit 110, based on the synchronization signal and the timing control signal, provides a drive signal to the radiation detection unit 111 so that the radiation detection unit 111 repeats a readout operation (T15-T14) and a storing operation (T16-T15) in a synchronization signal interval. By this, the storing operation time period (T16-T15) becomes longer with respect to the storing operation time period prior to the mode change. Specifically, the time period outside of the time period for the read out is used effectively for storage. Also, the start timing (T11 and T14) of the readout operation in relation to the synchronization signal (S11) does not change, and the storing operation finish timing (T13 and T16) does not change. Accordingly, before and after the mode change, the readout operation and the storing operation fit into a cycle of the synchronization signal (S11).

FIG. 5 is a schematic diagram describing a timing chart of the radiation imaging in the present embodiment. When the control apparatus 103 transmits the synchronization signal (S1) and imaging information such as the frame rate and the image size to the radiation imaging apparatus 104, the timing control unit 112 of the radiation imaging apparatus 104, based on the received imaging information, generates a timing control signal.

In the case of no image trimming, the timing control unit 112 generates a timing control signal (S2) for when no trimming (first timing control signal of step S104). The timing control signal (S2) for when not trimming synchronizes to the operation state 1 (S3) of the effective pixel region, and is controlled to perform the readout operation (T3-T5) when it is high level and the storing operation when it is low level (T5-T6). The effective pixel region is an image region transmitted from the radiation imaging apparatus 104 to the control apparatus 103. In the case of no image trimming, the entire pixel region for which read out is possible is the effective pixel region. In the operation state 1 (S3) of the effective pixel region, the readout operation and the storing operation fit within a cycle of the synchronization signal (S1) from the control apparatus 103. Since operation of one frame fits within the synchronization signals (S1) from the control apparatus 103, control of the radiation imaging system 100 is easy.

In the case of image trimming, the timing control unit 112 generates the timing control signal (S4) for when there is trimming. The timing control signal (S4) for when there is trimming is synchronized with the synchronization signal (S1) from the control apparatus 103, and is generated so as to rise earlier by a fixed period (T2-T1) (second timing control signal of step S105). Since it rises the fixed period earlier, the operation state 2 (S5) of the effective pixel region fits into a cycle of the synchronization signal (S1) from the control apparatus 103. Also, by the timing control signal (S4) when performing trimming, at the trigger (T3) of the synchronization signal (S1) from the control apparatus 103, the readout operation is started, and the storing operation is started at the time of switching from the high level to the low level (T4). At the next synchronization signal (S1) from the control apparatus 103, the storing operation terminates.

Note that in the example of FIG. 5, the timing control signal (S2) when not trimming and the timing control signal (S4) when trimming have a high level and a low level, but instead they may each have predetermined levels. For example, a first level and a second level may be used instead of the high level and low level of the timing control signal (S2) for when not trimming, and a third level and a fourth level may be used instead of the high level and low level of the timing control signal (S4) when trimming.

In this way, by virtue of the present embodiment, it is possible to ensure a sufficient dose at a high framerate in a small field of view, and because this does not depend on the capabilities of the radiation source, it leads to a cost reduction of the radiation imaging system. Also, by shortening the time period until the start of read out from the synchronization signal, there is the effect that stress in the image display is alleviated.

Note that the previously described embodiment is merely illustrating an example of an embodiment of the present invention, and the technical scope of the present invention should not be interpreted to be limited by this. That is, the present invention can be embodied in various forms without deviating from the technical concept and principal features thereof.

Second Embodiment

Next, explanation is given regarding a radiation imaging system including a radiation imaging apparatus in a second embodiment of the present invention. A configuration of the radiation imaging system in the present embodiment is, similarly to in FIG. 1 described in the first embodiment, configured from the radiation source 101, the radiation generating apparatus 102, the control apparatus 103, and the radiation imaging apparatus 104. The configuration of the radiation imaging apparatus 104 is similar to that described in FIG. 2 in the first embodiment.

The procedure of radiation imaging by the radiation imaging apparatus 104 in the present embodiment is similar to that described in FIG. 3 in the first embodiment, but differs in the following points. Specifically, in the radiation imaging apparatus 104 in the present embodiment, in the case of Yes in step S103, the radiation imaging apparatus 104 receives from the control apparatus 103 a synchronization signal that is generated by the synchronization signal generation unit 122 of the control apparatus 103, and whose cycle is shorter compared to before the imaging mode change, and the timing control unit 112 adjusts the period (frequency) of the high level and low level in conformity with the received synchronization signal, and generates a timing control signal whose phase is adjusted.

FIG. 6 is a schematic diagram illustrating a timing chart for switching between the storing operation and the readout operation for radiation imaging according to an imaging mode change (mode change) in the present embodiment. Note that it is assumed that the timing chart is started in a no image trimming imaging mode.

Compared to FIG. 4 described in the first embodiment, the interval of the synchronization signal after the mode change (MC in FIG. 6) (in other words, the cycle of the synchronization signal) is shortened. Also, the periods of the high level and low level of the timing control signal becomes respectively shorter (the frequency becomes higher), and the timing control signal (S13) is expedited by a fixed period similarly to in FIG. 4. By the synchronization signal generation unit 122 and the timing control unit 112 generating the synchronization signal and the timing control signal, as illustrated in FIG. 6, it is possible to change the synchronization signal cycle and the ratio of the storing operation time period and the readout operation time period so that the storing operation time period does not change from what it was prior to the MC.

Also, changing the cycle of the synchronization signal corresponds to the range of a partial region for trimming. Specifically, by the synchronization signal generation unit 122 and the timing control unit 112 generating the synchronization signal and the timing control signal, as illustrated in FIG. 6, it is possible to change the range of the partial region for trimming and the ratio of the storing operation time period and the readout operation time period so that the storing operation time period does not change from what it was prior to the MC.

By such control, it is possible to use a time period other than the time period for read out effectively for storage in relation to high-speed imaging. Accordingly, even in a case where high-speed imaging is performed in relation to a small field of view image according to image trimming, it is possible to sufficiently ensure a dose for radiation imaging.

Third Embodiment

In the first embodiment and the second embodiment described above, the storing operation time period and the readout operation time period are changed at a time of imaging mode change, however, the timing that is the trigger for changing the storing operation time period and the readout operation time period is not limited to when the imaging mode changes. For example, configurations may be taken so that, in accordance with an imaging part being designated by a user or the like, the storing operation time period and the readout operation time period are changed in accordance with the methods of the above described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-174004, filed Sep. 6, 2016, which is hereby incorporated by reference herein in its entirety.

What is claimed is:

1. A radiation imaging apparatus, comprising:
a sensor array in which a plurality of pixels are arranged in a matrix form; and
a control unit configured to, based on a synchronization signal comprised of a cyclical pulse train and a timing control signal synchronized to the synchronization signal, cyclically perform a storing operation that stores charge in the pixels and a reading out operation that reads out the charge stored in the pixels, wherein
the control unit, in accordance with a range of a partial region for trimming in a region of the sensor array in which read out is possible, changes a phase of the timing control signal in relation to the synchronization signal.

2. The radiation imaging apparatus according to claim 1, wherein the control unit, in one cycle of the synchronization signal, performs the storing operation that stores charge in the pixels and the reading out operation that reads out the charge stored in the pixels.

3. The radiation imaging apparatus according to claim 1, wherein in synchronization with the synchronization signal, the reading out operation is started or the storing operation is terminated, and at a timing at which a pulse of the timing control signal falls, the reading out operation is terminated or the storing operation is started.

4. A radiation imaging apparatus, comprising:
a sensor array in which a plurality of pixels are arranged in a matrix form; and
a control unit configured to perform a storing operation that stores charge in the pixels and a reading out operation that reads out the charge stored in the pixels at a predetermined cycle, wherein
the control unit, in accordance with a range of a partial region for trimming in a region of the sensor array in which read out is possible, changes the cycle and a ratio between a period over which the storing operation is performed and a period over which the reading out operation is performed in one cycle.

5. The radiation imaging apparatus according to claim 4, wherein the control unit changes the cycle and the ratio so that the period over which the storing operation is performed does not change.

6. The radiation imaging apparatus according to claim 4, wherein the control unit, based on a synchronization signal configured from a cyclical pulse train and a timing control signal synchronized to the synchronization signal, performs the storing operation and the reading out operation, and in accordance with the range of the partial region for trimming, changes a phase of the timing control signal in relation to the synchronization signal.

7. A radiation imaging apparatus, comprising:
a sensor array in which a plurality of pixels are arranged in a matrix form; and
a control unit configured to perform a storing operation that stores charge in the pixels and a reading out operation that reads out the charge stored in the pixels at a predetermined cycle, wherein
the control unit, in accordance with the cycle, changes a range of a partial region for trimming in a region of the sensor array in which read out is possible, and a ratio between a period over which the storing operation is performed and a period over which the reading out operation is performed in one cycle.

8. The radiation imaging apparatus according to claim 7, wherein the control unit changes the range and the ratio so that the period over which the storing operation is performed does not change.

9. A radiation imaging apparatus, comprising:
a sensor array in which a plurality of pixels are arranged in a matrix form; and
a control unit configured to, based on a synchronization signal comprised of a cyclical pulse train and a timing control signal synchronized to the synchronization signal, perform, at a predetermined cycle, a storing operation that stores charge in the pixels and a reading out operation that reads out the charge stored in the pixels, wherein
the control unit, in accordance with a designated imaging part, changes a phase of the timing control signal in relation to the synchronization signal.

10. The radiation imaging apparatus according to claim 9, wherein the control unit changes a ratio between a period over which the storing operation is performed and a period over which the reading out operation is performed in one cycle of the synchronization signal.

11. The radiation imaging apparatus according to claim 10, wherein the control unit changes the cycle and the ratio so that the period over which the storing operation is performed does not change.

12. A method of controlling a radiation imaging apparatus having a sensor array in which a plurality of pixels are arranged in a matrix form, the method comprising:
   based on a synchronization signal comprised of a cyclical pulse train and a timing control signal synchronized to the synchronization signal, cyclically performing a storing operation that stores charge in the pixels and a reading out operation that reads out the charge stored in the pixels; and
   in accordance with a range of a partial region for trimming in a region of the sensor array in which read out is possible, changing a phase of the timing control signal in relation to the synchronization signal.

13. A method of controlling a radiation imaging apparatus having a sensor array in which a plurality of pixels are arranged in a matrix form, the method comprising:
   performing a storing operation that stores charge in the pixels and a reading out operation that reads out the charge stored in the pixels at a predetermined cycle; and
   in accordance with a range of a partial region for trimming in a region of the sensor array in which read out is possible, changing the cycle and a ratio between a period over which the storing operation is performed and a period over which the reading out operation is performed in one cycle.

14. A method of controlling a radiation imaging apparatus having a sensor array in which a plurality of pixels are arranged in a matrix form, the method comprising:
   performing a storing operation that stores charge in the pixels and a reading out operation that reads out the charge stored in the pixels at a predetermined cycle; and
   in accordance with the cycle, changing a range of a partial region for trimming in a region of the sensor array in which read out is possible, and a ratio between a period over which the storing operation is performed and a period over which the reading out operation is performed in one cycle.

15. A method of controlling a radiation imaging apparatus having a sensor array in which a plurality of pixels are arranged in a matrix form, the method comprising:
   based on a synchronization signal comprised of a cyclical pulse train and a timing control signal synchronized to the synchronization signal, performing, at a predetermined cycle, a storing operation that stores charge in the pixels and a reading out operation that reads out the charge stored in the pixels; and
   in accordance with a designated imaging part, changing a phase of the timing control signal in relation to the synchronization signal.

16. A radiation imaging apparatus, comprising:
   a sensor array in which a plurality of pixels are arranged in a matrix form; and
   a control unit configured to, based on a synchronization signal comprised of a cyclical pulse train and a timing control signal synchronized to the synchronization signal, perform a storing operation that stores charge in the pixels and a reading out operation that reads out the charge stored in the pixels at a predetermined cycle, wherein
   the control unit, changes a ratio between a period over which the storing operation is performed and a period over which the reading out operation is performed in one cycle by changing a phase of the timing control signal in relation to the synchronization signal.

17. A method of controlling a radiation imaging apparatus having a sensor array in which a plurality of pixels are arranged in a matrix form, the method comprising:
   based on a synchronization signal comprised of a cyclical pulse train and a timing control signal synchronized to the synchronization signal, performing a storing operation that stores charge in the pixels and a reading out operation that reads out the charge stored in the pixels at a predetermined cycle; and
   changing a ratio between a period over which the storing operation is performed and a period over which the reading out operation is performed in one cycle by changing a phase of the timing control signal in relation to the synchronization signal.

* * * * *